United States Patent

[11] 3,625,316

| [72] | Inventor | Yoshinori Mori<br>Toyota, Japan |
| --- | --- | --- |
| [21] | Appl. No. | 9,729 |
| [22] | Filed | Feb. 9, 1970 |
| [45] | Patented | Dec. 7, 1971 |
| [73] | Assignee | Aisin Seiki Kabushiki Kaisha<br>Kariya, Aichi Pref., Japan |
| [32] | Priority | Feb. 21, 1969 |
| [33] | | Japan |
| [31] | | 44/15734 |

[54] ANTIRATTLING DEVICE OF DISC BRAKE
6 Claims, 4 Drawing Figs.

| [52] | U.S. Cl. | 188/73.5 |
| --- | --- | --- |
| [51] | Int. Cl. | F16d 65/02 |
| [50] | Field of Search | 188/73.4, 73.5, 73.6, 205 A |

[56] References Cited
UNITED STATES PATENTS

| 3,493,084 | 2/1970 | Maurice | 188/205 A X |
| --- | --- | --- | --- |
| 3,294,205 | 12/1966 | Schanz | 188/205 A |
| 3,298,469 | 1/1967 | Robinette | 188/205 A X |

*Primary Examiner*—George E. A. Halvosa
*Attorney*—Pierce, Scheffler & Parker

ABSTRACT: An antirattling device for use on a spot-type disc brake which is formed of resilient material such as thin metal and engages at its intermediate portion backing plates guiding pins and at its ends a movable plate for preventing excessive vibrations of the backing plates and movable plate.

ANTIRATTLING DEVICE OF DISC BRAKE

SUMMARY OF THE INVENTION

This invention relates to improvements in spot-type disc brakes of the kind in which friction linings are adapted to be brought into engagement with opposite faces of a rotatable disc by hydraulic actuating means.

In spot-type disc brakes wherein the single hydraulic cylinder including two opposed pistons therein is located at one flat side of the rotatable disc and braking force is transmitted to the other flat side thereof through a movable member during brake application, the engaging portion of the movable member and stationary hydraulic cylinder is subject to rattling movement or vibration during movement of the vehicle which would cause the brake to become noisy. Also, the peripheries of the brake linings are frequently exposed at their top edges, so that water, dirt and other foreign material may be collected on these parts. The presence of this foreign material in this area affects the efficient operation of the brakes.

Therefore, one of the objects of this invention is to provide an antirattling device which may prevent excessive vibration or rattling movement of the backing plates of friction linings and the movable member.

Another object of this invention is to provide an antirattling device which may also act as a cover means to exclude dirt and other foreign material from the brake linings and brake disc.

Further object of this invention is to provide an antirattling device which may be economically manufactured, quickly and easily attached to a conventional disc brake.

These objects are achieved by a sheet metal which comprises intermediate embracing arms to hold guiding pins, intermediate land to prevent the rattling movement of the backing plate, and leg means to resiliently engage the movable member for preventing the vibrations thereof.

Further objects and advantages of the present invention will be apparent from the following description, reference being had to the accompanying drawings wherein a preferred embodiment of the present invention is clearly shown.

DETAILED DESCRIPTION

Figure 1:
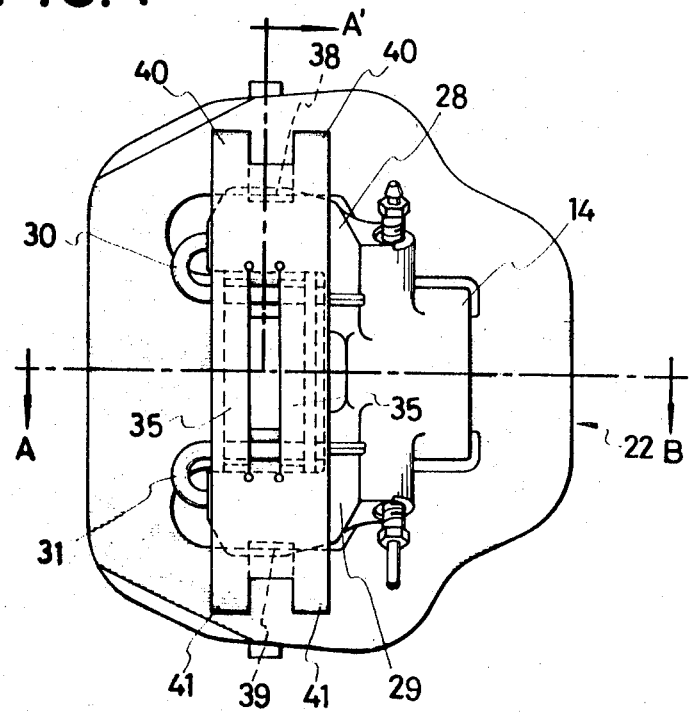
FIG. 1 is a plan view of a spot-type disc brake provided with an antirattling device of this invention.
Figure 2:
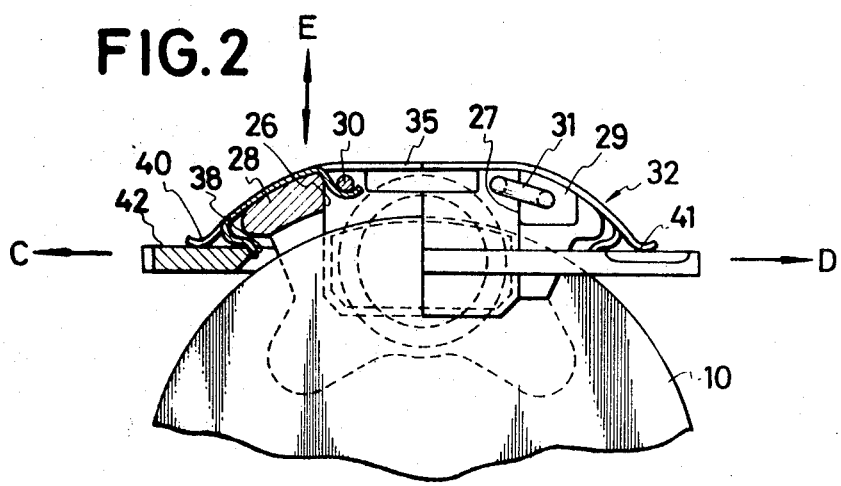
FIG. 2 is a fragmentary view partially in section taken on the plane indicated by line A—A' in FIG. 1.
Figure 3:
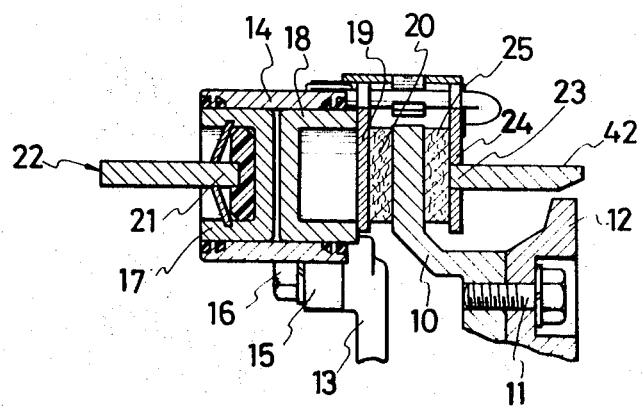
FIG. 3 is an elevational view in vertical section taken along the plane indicated by line A—B in FIG. 1.
Figure 4:
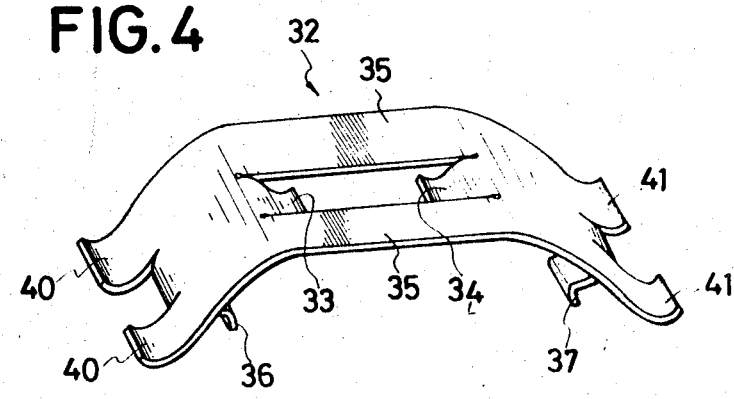
FIG. 4 is an enlarged perspective view of the antirattling device illustrated in FIGS. 1 to 3.

Referring to FIGS. 1 to 3, a disc 10 is fixed by securing means such as bolts 11 to a hub 12 of a vehicle wheel (not shown) and constitutes a rotating brake disc. The flank surfaces of this disc 1 are squeezed, during braking, by a caliper-type clamping mechanism, which is supported on a stationary member 13 formed integrally with a nonrotating part of a vehicle axle (not shown).

A hydraulic cylinder 14 having two open ends is fixed at a projecting part 15 thereof to the stationary member 13 by mounting means such as bolts 16. Within the cylinder 14, there are slidably fitted two opposed pistons 17 and 18. One piston 18 is directly engaged with a backing plate 19 of a brake pad 20 confronting one of the braking surfaces of the disc 10, while the other piston 17 is engaged with one inner edge 21 of a movable transfer member 22 having a closed ring-shaped substantially flat plate shape and having an opposite inner edge 23 which is engaged with a backing plate 24 of a brake pad 25 facing the other braking surface of the brake disc 10.

The backing plates 19 and 24 supporting the brake pads 20 and 25 are slidably supported by guide surfaces 26 and 27 of two guide arms 28 and 29 extending above and across the brake disc 10 from the hydraulic cylinder 14. During brake application, the brake pads 20 and 25 receive the brake clamping respectively from the piston 18 and the inner edge 23 through backing plates 19 and 24, which are slidably guided by the guide surfaces 26 and 27 absorbing the torque created in the direction of rotation of the disc 10.

There are provided substantially J-shaped pins 30 and 31 for guiding and supporting the backing plates 19 and 24. Each pin is securely mounted at each end to the cylinder and one guide arm respectively.

The subject matter of the present invention consists in providing an antirattling device 32, made of resilient sheet material, which is arched longitudinally and is adapted to cover over the top edges of the backing plates and brake pads, and the adjacent periphery of the brake disc the device being formed by stamping from a rectangular strip of metal.

The antirattling plate 32 comprises at its intermediate portion a pair of cut embracing arms 33 and 34 for resiliently holding the pins 30 and 31 in the upward direction as seen in FIG. 2 or 3, the remaining land 35 resiliently engages with the outer edges of the backing plates 19 and 24 for preventing the upward movement thereof. The device 32 also comprises a pair of cut tongue ends 36 and 37 for resiliently engaging opposed inner lateral rims 38 and 39 of the movable transfer plate 22, respectively, and a pair of winged ends 40, 40 and 41, 41 provided at both sides of the tongues 36 and 37 for resiliently engaging an upper surface 42 of the transfer member 22. It will be understood that the antirattling plate 32 is rigidly attached to the pins 30 and 31 which are also secured to the hydraulic cylinder 14 and guide arms 28 and 29 formed integrally therewith as previously described.

The cut-tongues 36 and 37 urge the transfer member in mutually opposite directions of the brake disc 10 as indicated by arrows C and D in FIG. 2, respectively, so that any undesirable movement of the transfer plate 22 in these directions will be prevented. The presence of the cut embracing arms 33 and 34 and the wings 40 and 41 prevents the oscillating movement of the transfer plate 22 in the vertical direction as indicated by double-headed arrow E in FIG. 2; more particularly, the wings 40 and 41 urge the transfer member 22 in the downward direction as viewed in FIG. 2 while the transfer member 22 is held laterally at 21 by the piston 17 and at 23 by the backing plate 24 against the resilient depressing force of the wings 40 and 41, so that the transfer member 22 is maintained substantially in the horizontal direction in FIG. 2 or 3 against vibrations. The construction of the device is such that it may be readily assembled and attached to a disc brake, and all of the parts may be made as stampings from sheet metal.

It should be noted that the gripping force of the resilient plate is not so strong as to prevent the transfer member from being moved in the brake disc axial direction during brake application or brake releasing.

In addition, it should be recognized that the antirattling device is sufficiently large to cover the top edges of the backing plates, the brake pads and the brake disc as clearly shown in FIG. 1 so that the device is also useful in shielding the engaging surfaces of the brake from dirt, mud and other foreign material therefrom.

In a modification the antirattling device may comprise a pair of two winged ends resiliently engaging the transfer member to restrict the horizontal vibration thereof and a pair of the cut tongues between respective wings to restrict the vertical vibration thereof, or alternatively it may comprise at each end one wing portion and one tongue portion engaged with the upper surface of the transfer member and the inner lateral rim thereof, respectively.

I claim:

1. An antirattling device for a spot-type disc brake in which two brake pads are slidably supported on a pair of pins secured to a hydraulic cylinder disposed on one side of a brake disc, said hydraulic cylinder having two opposed pistons for actuating the brake pads, one of said brake pads being actuated by means of a substantially annular transfer member actuated by one of the opposed pistons, said device comprising a metal plate having resilient means for engaging one face and inside opposed edges of the substantially annular transfer member and having resilient means engaging the pins supporting the brake pads.

2. A device as claimed in claim 1 wherein said metal plate has a central portion for shielding the brake pads to prevent access of foreign material thereto during use.

3. A device as claimed in claim 1 wherein said metal plate is formed from a rectangular metal sheet by stamping.

4. A device as claimed in claim 1 wherein each end of said metal plate is provided with a pair of resilient means for engaging the upper face of the substantially annular transfer member and a resilient means for engaging an inside edge of the substantially annular transfer member.

5. A device as claimed in claim 1 wherein each end of the metal plate is provided with a resilient means for engaging an upper face of the substantially annular transfer member and a pair of resilient means for engaging an inside edge of the substantially annular transfer member.

6. A device as claimed in claim 1 wherein each end of the metal plate is provided with a resilient means for engaging a face of the substantially annular transfer member and a resilient means for engaging an inside edge of the substantially annular transfer member.

* * * * *